(12) United States Patent
Kadowaki et al.

(10) Patent No.: US 7,420,310 B2
(45) Date of Patent: Sep. 2, 2008

(54) BRUSHLESS MOTOR

(75) Inventors: Koji Kadowaki, Sakaiminato (JP); Hideo Kimura, Yonago (JP)

(73) Assignee: Matsushita Electric Industries, Co., Ltd., Osaka (JP)

( * ) Notice: Subject to any disclaimer, the term of this patent is extended or adjusted under 35 U.S.C. 154(b) by 314 days.

(21) Appl. No.: 11/280,407

(22) Filed: Nov. 17, 2005

(65) Prior Publication Data

US 2006/0113854 A1     Jun. 1, 2006

(30) Foreign Application Priority Data

Nov. 26, 2004 (JP) .............................. 2004-341340
Nov. 29, 2004 (JP) .............................. 2004-343231

(51) Int. Cl.
*H02K 1/06* (2006.01)

(52) U.S. Cl. .................... 310/217; 310/67 R; 310/90

(58) Field of Classification Search .............. 310/67 R, 310/89–90, 216–218, 254
See application file for complete search history.

(56) References Cited

U.S. PATENT DOCUMENTS 4,570,093 A * 2/1986 Morii et al. .................... 310/46
4,682,065 A * 7/1987 English et al. ................ 310/90
4,795,931 A * 1/1989 Sturm .......................... 310/90
4,867,581 A * 9/1989 Schmidt et al. ............. 384/517
5,910,694 A * 6/1999 Yokozawa et al. ............ 310/89
7,012,346 B2 * 3/2006 Hoffman et al. .............. 310/43
2004/0135462 A1 * 7/2004 Masayuki .................... 310/261

FOREIGN PATENT DOCUMENTS

| JP | 62-168779 | 10/1987 |
| JP | 7-9067 | 2/1995 |
| JP | 11-89196 | 3/1999 |
| JP | 2001-057747 | 2/2001 |

* cited by examiner

*Primary Examiner*—Thanh Lam
(74) *Attorney, Agent, or Firm*—Steptoe & Johnson LLP

(57) ABSTRACT

Of two bearings supporting a rotor of a circuit-integrated type core-equipped brushless motor, a part of an outer periphery of the bearing, which is disposed at a position near a stator core, is allowed to directly abut on an inner periphery of a hole formed in a center of the stator core, and therefore, reduction in thickness, reduction in diameter, space-saving and enhancement in output power can be realized. The stator core is fixed to the casing by causing projected parts provided at the housing to bite into second notched parts formed inside first notched parts formed at the stator core and crimping them, whereby the problem of a decrease in a winding space accompanying reduction in a diameter of the stator core is solved, and reduction in thickness, reduction in diameter, space-saving and enhancement in output power are achieved.

11 Claims, 18 Drawing Sheets

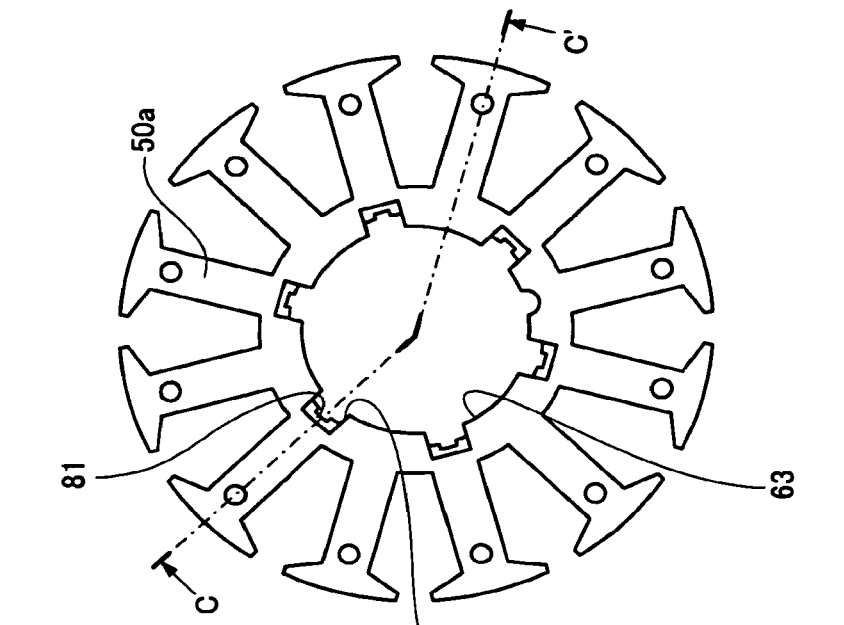
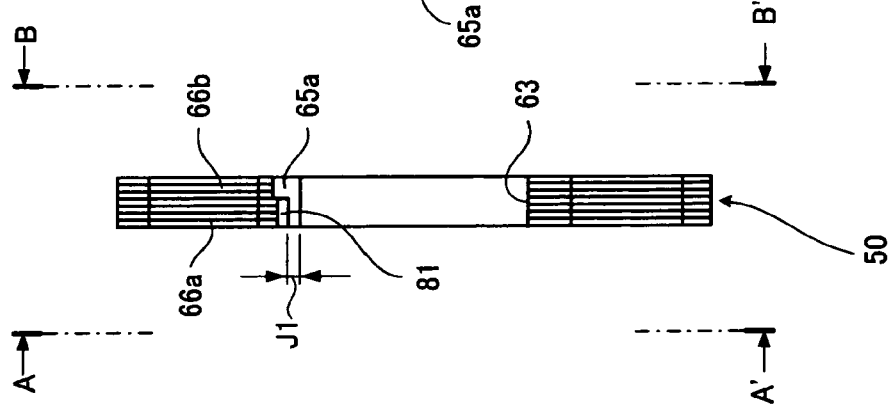
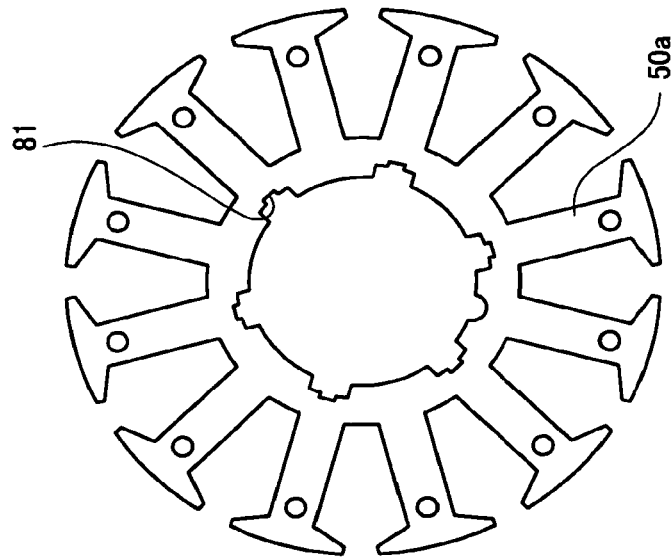

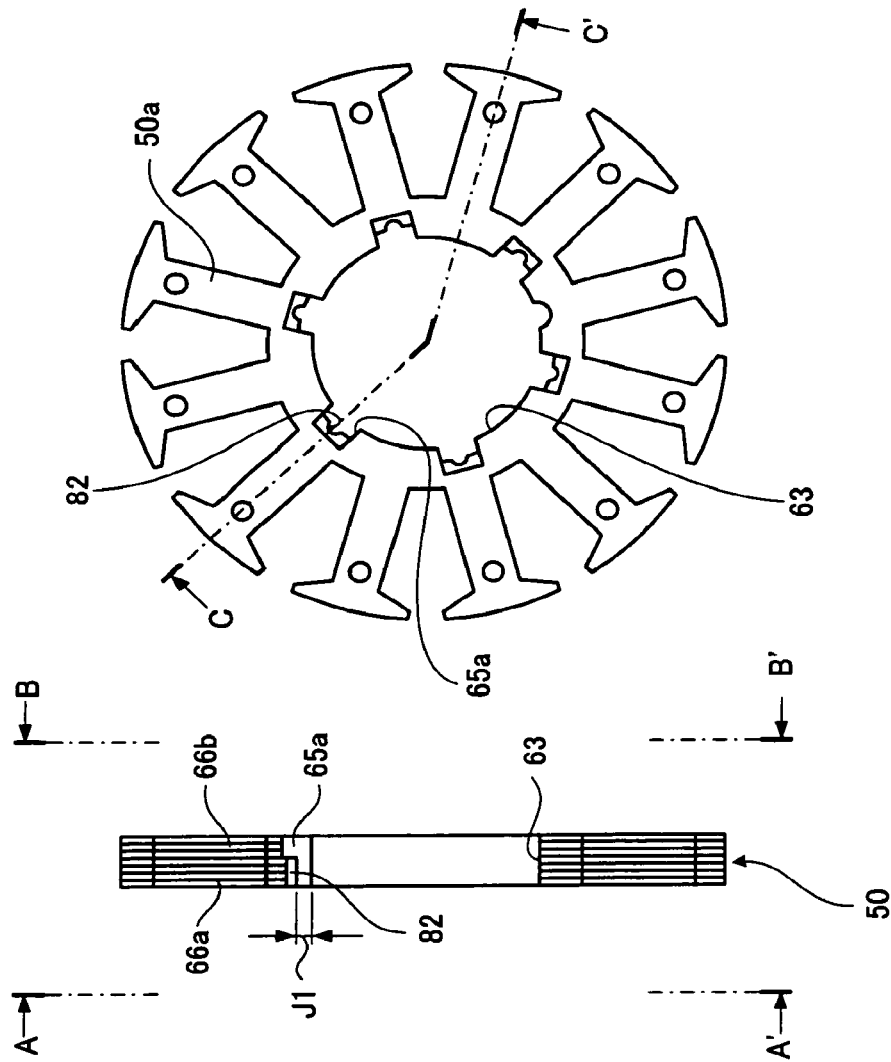
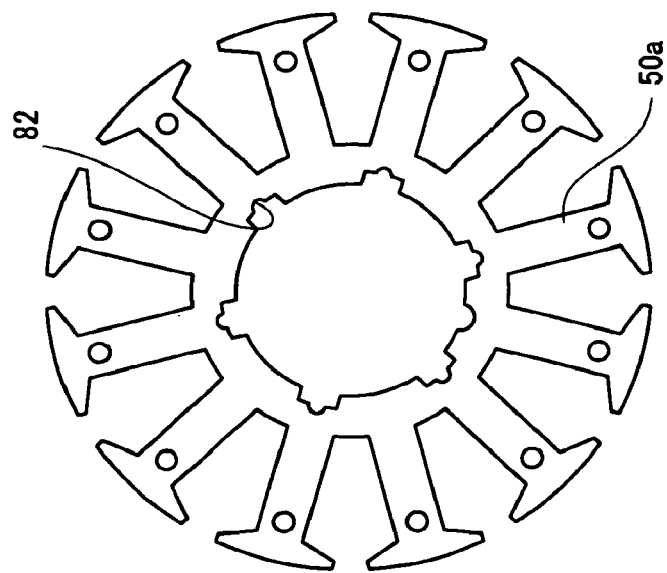
FIG.13C
FIG.13B
FIG.13A

BRUSHLESS MOTOR

FIELD OF THE INVENTION

The present invention relates to a brushless motor used as a main motor which simultaneously drives various kinds of mechanisms of copying machines, laser beam printers and the like.

BACKGROUND OF THE INVENTION

In recent years, office machine such as copying machines, laser printers and the like aim at high image quality, high-speed printing, and colorization, and in order to realize them at the same time, they tend to be of a so-called tandem engine type each including a photo sensitive drum for each color. Increase in size of apparatuses is inevitable since the apparatuses, which conventionally have the constructions of one drum, adopt the constructions of two drums and four drums, but in order to suppress an increase in size, the main motors which drive various kinds of mechanisms are required to be thin, small in diameter, space-saving and high in output power.

As the main motor, a brushless motor, in which a motor part including a stator with a stator core (iron core) suitable for high output power and a drive/control circuit for rotationally driving and controlling the motor are integrally mounted, is generally used, and is required to be thin, small in diameter, space-saving and high in output power as the whole motor including the circuit part.

For this purpose, it is desired that the outside diameter dimension of the rotor part of the motor is made small, the outside dimension of the circuit part is made as close as possible to the dimension of the square which circumscribes the rotor part, and the height dimension is also made as close as possible to the height dimension of the rotor part.

Conventionally, a brushless motor in which a circuit part and a motor are integrally incorporated generally has the construction including a stator with a coil wound around a stator core, a rotor in which a ring-shaped magnet having a plurality of magnetic poles opposed to the stator core is fixed to an inner peripheral surface of a cup-shaped rotor frame and a shaft is mounted at a center, bearings which support the shaft of the rotor, and a housing which holds the bearings, in which the stator core and a circuit board on which circuit components are mounted are attached to the housing (see Japanese Utility Model Laid-open No. 7-9067, for example).

FIG. 14 shows a structure of the first prior art example.

Reference numeral 18 denotes a rotor frame (cup part), reference numeral 20 denotes a rotor magnet (driving magnet), which is fixed to the rotor frame 18 with a speed detecting magnet 22, and a shaft 24 is mounted to a center of the rotor frame 18, whereby a rotor 16 is constructed. The shaft 24 is rotatably supported by bearings 28 and 28 held by a housing 12.

A stator core 48 which is disposed to be opposed to the rotor magnet 20 and a circuit board 30 are attached to the housing 12, and a drive/control circuit having a controlling integrated circuit 34 for rotationally driving and controlling the rotor 16 is mounted on the circuit board 30.

However, in this conventional construction, a space for inserting a bolt 46, which fixes the stator core 48 and the circuit board 30 to the housing 12, through is required in an inner peripheral part of the stator core 48. Further, a space for fitting an outer peripheral portion of the housing 12 which holds the bearings 28 and 28 in its inner periphery into a hole formed in a center of the stator core 48 is also required.

In order to decrease an outside diameter of the rotor 16, an outside diameter of the stator core 48 also needs to be decreased, and therefore, there arises the problem that the space for winding a coil 14 around the stator core 48 decreases and the output power of the motor significantly reduces.

As an example of fastening with a bolt as in FIG. 14, an example shown in FIGS. 15 and 16 is conceivable. In this example, a base end portion of a housing 2 is fixed to a plate 1, the circuit board 30 on which the drive/control circuit is mounted is screwed onto the housing 2 with bolts 31, a stator core 33 on which a winding wire 32 is wound is fixed to the housing 2 with bolts 34 as shown in FIG. 16. In this case, there also exists the same problem as the first prior art example.

In order to solve the problem, there exists Japanese Patent Laid-open No. 11-89196 shown in FIGS. 17 and 18.

In the second prior art example, at fitting portions of the housing 2 which holds bearings 11 and 12 for supporting a shaft 6, a stator core 3 on which a winding wire 5 is wound, and a plate 1, a projected part 2a is formed on an outer peripheral portion of the housing 2 and a recessed part 3a is formed on an inner peripheral portion of the stator core 3, respectively. After the projected part 2a of the housing 2 and the recessed part 3a of the stator core 3 are engaged with each other, they are fixed by crimping.

As described above, according to the second prior art example, a space for a fastening portion of the stator core 3 and the housing 2 can be made smaller than the case of the first prior art example, and therefore, a space for winding more coil around the stator core 3 can be secured. Therefore, a highly efficient motor is obtained.

However, in the second prior art example, the problem of requiring a space for fitting the housing 2 in the inner peripheral portion of the stator core 3 is not solved.

The present invention solves the above conventional problem, and has an object to provide a brushless motor in which a drive/control circuit is incorporated integrally with the motor and which is designed to be thin, small in diameter, space-saving and high in output power.

DISCLOSURE OF THE INVENTION

A brushless motor of the present invention which solves the above described problem is characterized in that a part of an outer periphery of a bearing, which is disposed at a position near a stator core, of two bearings that support a rotor is allowed to directly abut on an inner periphery of a hole formed in a center of the above described stator core.

In concrete, a brushless motor according to the first aspect of the present invention is characterized by having a stator core having a plurality of salient poles with a wire wound around the salient poles; a rotor including a cup-shaped rotor frame in which a ring-shaped magnet disposed to be opposed to the stator core with a plurality of driving magnetizations applied to the ring-shaped magnet in a circumferential direction is mounted to its inner peripheral side, and a shaft fixed to a center of the rotor frame; two bearings rotatably supporting the shaft; and a housing which holds the bearings and the above described stator core, and is characterized in that a part of an outer periphery of the bearing, which is disposed at a position near the stator core, of the above described two bearings directly abuts on an inner periphery of a hole formed in a center of the above described stator core.

A brushless motor according to the second aspect of the present invention is such that in the brushless motor of the first aspect, a part of the outer periphery of the bearing, which is disposed at the position near the stator core, of the two bearings is held in an inner periphery of a cylindrical part formed in a center of the housing, and an outside dimension of the cylindrical part is formed to be larger than an inside diameter dimension of the hole formed in the center of the stator core.

A brushless motor according to the third aspect of the present invention is such that in the brushless motor of the second aspect, a plurality of projected parts are formed from an end surface of the housing at a stator core side to the opposite surface of the stator core in an axial direction, and a plurality of notched parts through which the projected parts are capable of being inserted are formed at positions of the stator core, which correspond to the projected parts.

A brushless motor according to the fourth aspect of the present invention is such that in the brushless motor of the third aspect, the plurality of notched parts are formed at positions of the inner periphery of the hole formed in the center of the stator core, which correspond to the salient poles on an outer periphery of the stator core, along a circumferential direction.

A brushless motor according to the fifth aspect of the present invention is such that in the brushless motor of the third aspect, an outer periphery of the bearing, which is disposed at the position near the stator core, abuts on the housing only at the positions of the projected parts in a range of thickness of the above described stator core.

A brushless motor according to the sixth aspect of the present invention is such that in the brushless motor of the fourth aspect, an outer periphery of the bearing, which is disposed at the position near the stator core, abuts on the housing only at the positions of the projected parts in a range of thickness of the above described stator core.

A brushless motor according to the seventh aspect of the present invention is characterized by having a stator core having a plurality of salient poles with a wire wound around the salient poles; a rotor including a cup-shaped rotor frame in which a ring-shaped magnet disposed to be opposed to the stator core with a plurality of driving magnetizations applied to the ring-shaped magnet in a circumferential direction is mounted to its inner peripheral side, and a shaft fixed to a center of the rotor frame; two bearings rotatably supporting the shaft; and a housing holding the bearings and the above described stator core, and is characterized in that a part of an outer periphery of the bearing, which is disposed at a position near the stator core, of the above described two bearings directly abuts on an inner periphery of a hole formed in a center of the above described stator core; in that at least a part of the other of the outer periphery of the above described bearing is held in an inner periphery of a cylindrical part formed in a center of the housing; in that a plurality of projected parts are formed from an end surface of the above described housing at a stator core side to the opposite surface of the stator core in the axial direction; and in that a plurality of first notched parts through which the projected parts are capable of being inserted are formed at positions of the above described stator core, which correspond to the projected parts, a depth dimension of the first notched part in a radial direction is formed to be shallower at a side of the end surface of the housing at the stator core side than at an opposite side, and second notched parts are formed at positions where the elastically deformed projected parts are engaged in the depth direction in the radial direction at locations shallow in depth dimension in the radial direction inside a plurality of first notched parts.

A brushless motor according to the eighth aspect of the present invention is such that in the brushless motor of the seventh aspect, the stator core is constructed by laminating two kinds of cores which have different depth dimensions in the radial direction of the first notched parts.

A brushless motor according to the ninth aspect of the present invention is such that in the brushless motor of the eighth aspect, the second notched parts are formed within a range of an inner side in a radial direction from an outer periphery in the radial direction of the one core with a large depth dimension.

A brushless motor according to the tenth aspect of the present invention is such that in the brushless motor of the seventh aspect, the plurality of notched parts are formed at positions of the inner periphery of the hole formed in the center of the stator core, which correspond to the salient poles on the outer periphery of the stator core, along the circumferential direction.

A brushless motor according to the eleventh aspect of the present invention is such that in the brushless motor of the eighth aspect, the plurality of notched parts are formed at positions of the inner periphery of the hole formed in the center of the stator core, which correspond to the salient poles of the outer periphery of the stator core, along the circumferential direction.

A brushless motor according to the twelfth aspect of the present invention is such that in the brushless motor of the ninth aspect, the plurality of notched parts are formed at positions of the inner periphery of the hole formed in the center of the stator core, which correspond to the salient poles of the outer periphery of the stator core, along the circumferential direction.

A brushless motor according to the thirteenth aspect of the present invention is such that in the brushless motor of the seventh aspect, the outer periphery of the bearing, which is disposed at the position near the stator core, abuts on the housing only at the positions of the projected parts in a range of thickness of the above described stator core.

According to the brushless motor of the present invention, a part of the outer periphery of the bearing, which is disposed at the position near the stator core, of the two bearings that support the rotor is allowed to directly abut on the inner periphery of the hole formed in the center of the above described stator core. Therefore, the housing is not interposed between the hole formed in the center of the stator core and the bearing, and accordingly, the diameter of the hole formed in the center of the stator core can be made small. Thereby, the space for winding the wire on the stator core can be secured. Therefore, decrease of output power can be prevented, and the brushless motor suitable for reduction in diameter, space-saving and enhancement of output power can be realized.

Besides, according to the brushless motor of the present invention, a part of the outer periphery of the bearing, which is disposed at the position close to the stator core, of the two bearings is held in the inner periphery of the cylindrical part formed in the center of the housing, and the outside dimension of the cylindrical part is made larger than the inside diameter dimension of the hole formed in the center of the stator core. A plurality of projected parts are formed from the end surface of the cylindrical part formed in the center of the housing at the stator core side toward the stator core side in the axial direction, and a plurality of notches through which the projected parts are capable of being inserted are formed at the positions of the stator core, which correspond to the projected parts. Therefore, mounting of the stator core on the housing can be performed by the projected parts. As a result, the space of the inner peripheral part of the stator core can be effectively utilized, and the space for winding the wire on the stator core can be secured. Therefore, decrease of output power can be prevented, and the housing can be made smaller. Thus, reduction in the material is made possible and the brushless motor can be provided at low cost.

Besides, according to the brushless motor of the present invention, the notched parts are formed at the positions of the inner periphery of the hole formed in the center of the stator core, which correspond to the salient poles on the outer periphery of the stator core, along the circumferential direction, and therefore, the notches are located away from the stator core inner periphery which is the connecting portion of the salient poles on the outer periphery of the stator core. Therefore, the influence of an increase of the magnetic resistance of the connecting portion of the salient poles on which the magnetic flux concentrates can be suppressed, and at the same time, it is not necessary to make the slot portion of the stator core shallow to the outside in the radial direction. Thus, the space for winding the wire on the stator core can be secured, and therefore, decrease of output power can be prevented.

According to the brushless motor of the present invention, the outer periphery of the bearing which is disposed at the position near the stator core abuts on the housing only at the positions of the projected parts in the range of the thickness of the stator core, and therefore, the space in the inner peripheral portion of the stator core can be effectively utilized to make it possible to secure the space for winding the coil on the stator core. Therefore, decrease of output power can be prevented, and the drive/control circuit-integrated brushless motor which is suitable for reduction in diameter, space-saving and enhancement in output power can be provided at low cost.

According to the brushless motor of the present invention, a part of the outer periphery of the bearing which is disposed at the position near the stator core directly abuts on the inner periphery of the hole formed in the center of the stator core, and a part of the outer periphery of the bearing, which is disposed at the position near the stator core, of the two bearings is held in the inner periphery of the cylindrical part formed in the center of the housing. A plurality of projected parts are formed from the end surface of the housing at the stator core side toward the stator core side in the axial direction, and in the stator core, a plurality of first notched parts through which the projected parts are capable of being inserted are formed at the positions corresponding to the projected parts. Therefore, the housing is not interposed between the hole formed in the center of the stator core and the bearing, and thus, the diameter of the hole can be made small. It is made possible to mount the stator core with a small space without using a fixing member such as a bolt by inserting a plurality of projected parts formed at the cylindrical part of the housing into the notched parts formed at the stator core and thereafter, by crimping the projected parts. Further, the first notched parts are formed so that the depth dimensions in the radial direction shallower at the side of the end surface of the housing at the stator core side than the opposite side, and the second notched parts are formed at the positions where the plastically deformed projected parts are engaged in the depth direction in the radial direction at the locations shallow in the depth dimensions in the radial direction inside a plurality of first notched parts. Therefore, it becomes possible to increase the strength against slipping-off in the rotational direction and the axial direction of the stator core. This construction is especially effective when the space for fixing is made small by making the projected parts small.

Thereby, the space for winding the coil on the stator core can be secured. Therefore, decrease of output power can be prevented, and the brushless motor suitable for reduction in diameter, space-saving and enhancement in output power can be realized.

Since the stator core is constructed by laminating two kinds of cores having different depth dimensions in the radial direction of the first notched parts, the stator core with a complicated shape can be easily realized.

Since the second notched parts are formed in the range inside in the radial direction from the outer periphery in the diameter direction of the one core large in the depth dimension, the crimped projected parts of the housing closely contact the second notched parts to the back of the section, and the larger contact area can be obtained, thus making it possible to increase the strength against slipping-off in the rotational direction and the axial direction.

Since the notched parts are formed at the positions of the inner periphery of the hole formed in the center of the stator core, which correspond to the salient poles on the outer periphery of the stator core, in the circumferential direction, the first notched parts can be located away from the inner periphery of the stator core which is the connecting portion of the salient poles on the outer periphery of the stator core, and the influence of an increase in the magnetic resistance of the connecting portion of the salient poles on which the magnetic flux concentrates can be suppressed, at the same time of which, it is not necessary to make the slot portion of the stator core shallow to the outside in the radial direction. Therefore, a space for winding the winding wire on the stator core can be secured, and the brushless motor which can prevent decrease of output power, and is suitable for reduction in diameter, space-saving and enhancement in output power can be realized.

Since the outer periphery of the bearing which is disposed at the position near the stator core abuts on the housing only at the positions of the projected parts of the housing, it is made possible to effectively utilize the space at the inner peripheral part of the stator core, and the space for winding the winding wire on the stator core can be secured. Therefore, decrease of output power can be prevented, and the brushless motor suitable for reduction in diameter, space-saving, and enhancement in output power can be realized.

BRIEF DESCRIPTION OF THE DRAWINGS

FIG. 12A is a bottom view of a stator core of (Embodiment 4) of the present invention;

FIG. 12B is a sectional view of the stator core of the same embodiment;

FIG. 12C is a top view of the stator core of the same embodiment;

FIG. 13A is a bottom view of a stator core of (Embodiment 5) of the present invention;

FIG. 13B is a sectional view of the stator core of the same embodiment;

FIG. 13C is a top view of the stator core of the same embodiment;

DESCRIPTION OF THE EMBODIMENTS

Hereinafter, each embodiment of the present invention will be described based on FIGS. 1 to 13A, FIGS. 13B and 13C.

Embodiment 1

FIGS. 1 to 7A and 7B shows (Embodiment 1) of the present invention.

Figure 1:
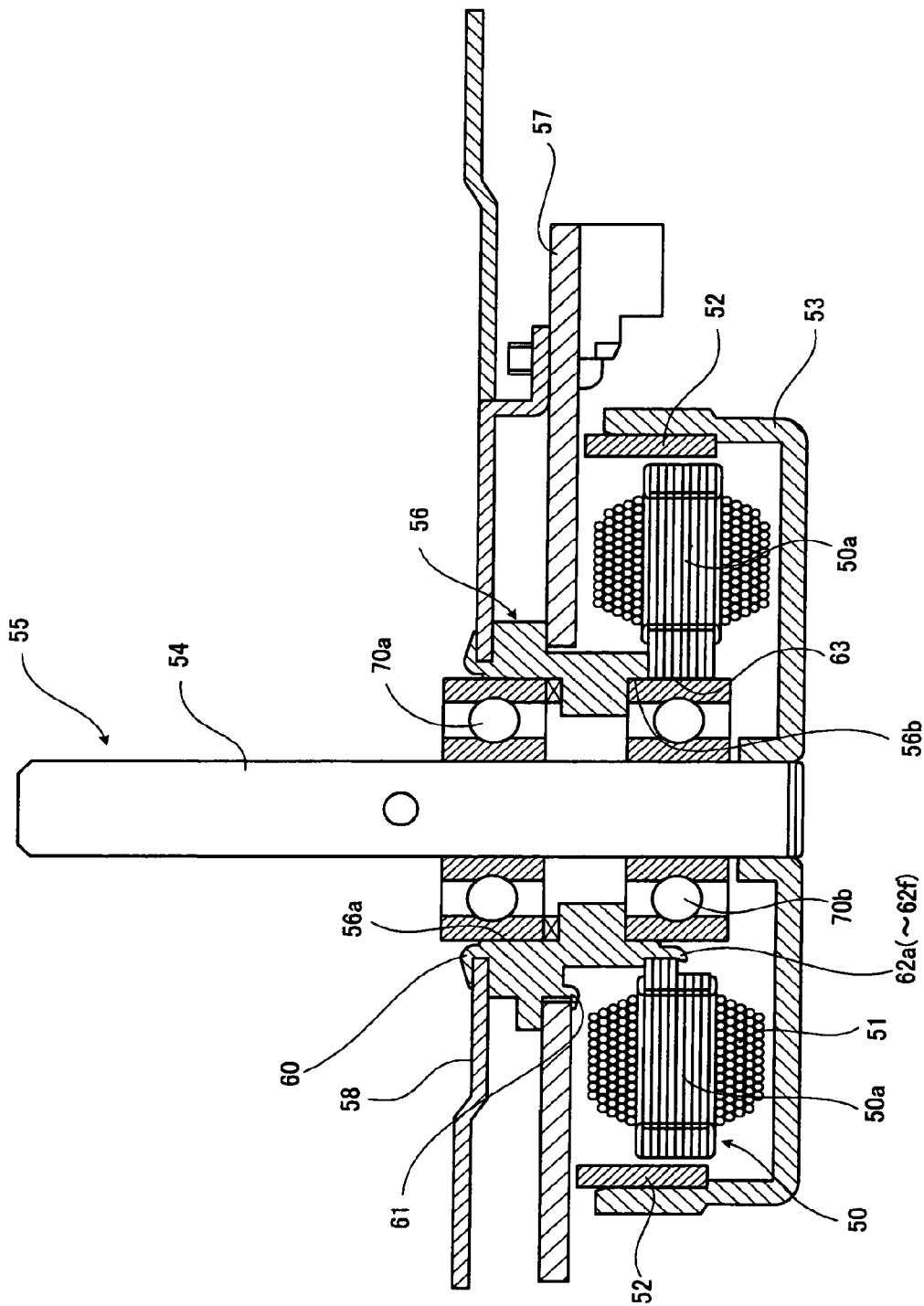
FIG. 1 is a sectional view of a brushless motor of (Embodiment 1) of the present invention.

FIG. 1 shows a brushless motor of the present invention.

A stator core 50 has a plurality of salient poles 50a and a winding wire 51 is wound around the salient poles 50a. A plurality of driving magnetizations are applied in a circumferential direction to a ring-shaped magnet 52 disposed to be opposed to the stator core 50. The ring-shaped magnet 52 is mounted to an inner peripheral side of a cup-shaped rotor frame 53. A shaft 54 is mounted in a center of the rotor frame 53, and a rotor 55 is constructed by the ring-shaped magnet 52, the rotor frame 53 and the shaft 54.

The shaft 54 is rotatably supported by two bearings 70a and 70b disposed with a space therebetween. A cylindrical housing 56 holds the bearings 70a and 70b, the stator core 50 and a circuit board 57 loaded with a drive/control circuit for rotationally driving and controlling the above described rotor 55. Reference numeral 58 denotes a plate for mounting, which is fixed to an end portion of the above described housing 56.

Figure 2:
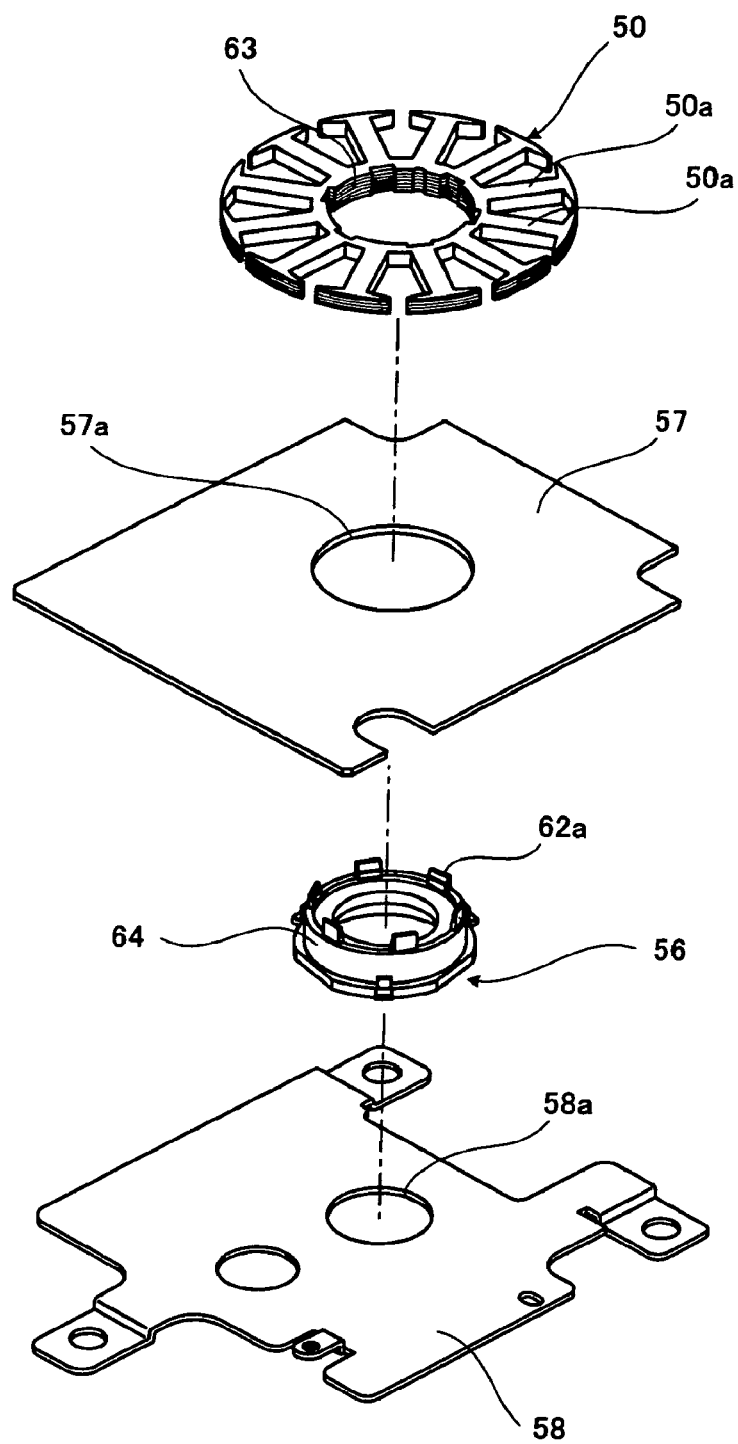
FIG. 2 is an exploded perspective view of a main part in the same embodiment.
Figure 3C:
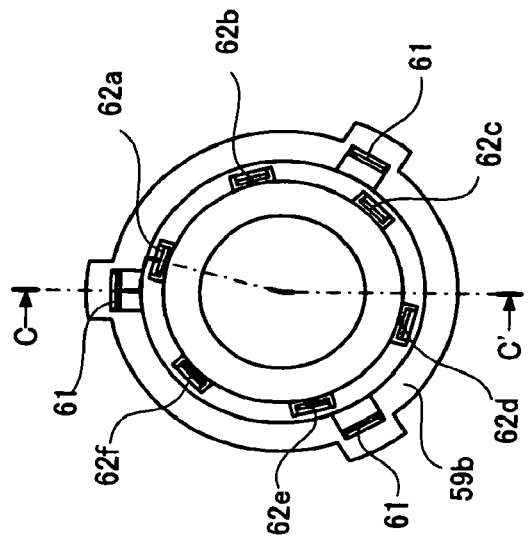
FIG. 3C is a top view of the housing in the same embodiment.
Figure 3B:
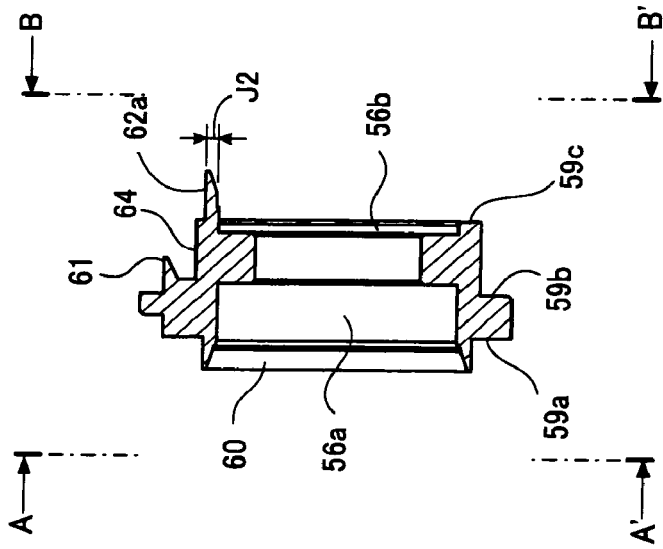
FIG. 3B is a sectional view of the housing in the same embodiment.
Figure 3A:
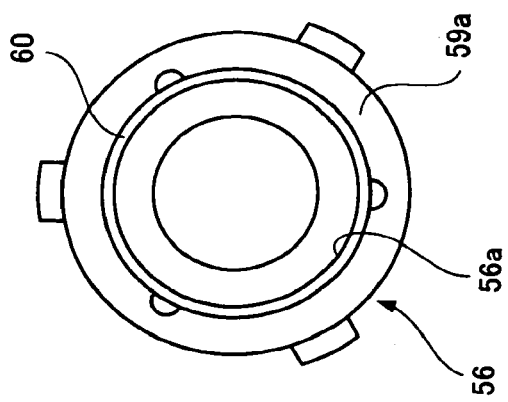
FIG. 3A is a bottom view of a housing in the same embodiment.

The above described housing 56 of zinc alloy die-cast is constructed as shown in FIG. 2 and FIGS. 3A to 3C. FIG. 3A is a view taken along the line A to A' in FIG. 3B, FIG. 3C is a view taken along the line B to B' in FIG. 3B, FIG. 3B is a sectional view taken along the line C to C' in FIG. 3C.

At one end of the housing 56, a first cylindrical part 56a is formed in a center of the housing 56 to house the bearing 70a. At the other end of the housing 56, a second cylindrical part 56b is formed in the center of the housing 56 to house the bearing 70b.

An annular wall 60 for mounting a plate is formed in an inner peripheral portion of a first support surface 59a at one end of the housing 56. The annular wall 60 has an outer peripheral surface vertically formed and an inner peripheral surface inclined toward a base end from a tip end with a tapered section and continues circumferentially. First projected parts 61, 61 and 61 for mounting the circuit board are formed on a second support surface 59b at an opposite side from the above described first support surface 59a of the housing 56. Second projected parts 62a, 62b, 62c, 62d, 62e and 62f for mounting the stator core are formed on an inner peripheral portion of a third support surface 59c at the other end of the housing 56.

Figure 4:
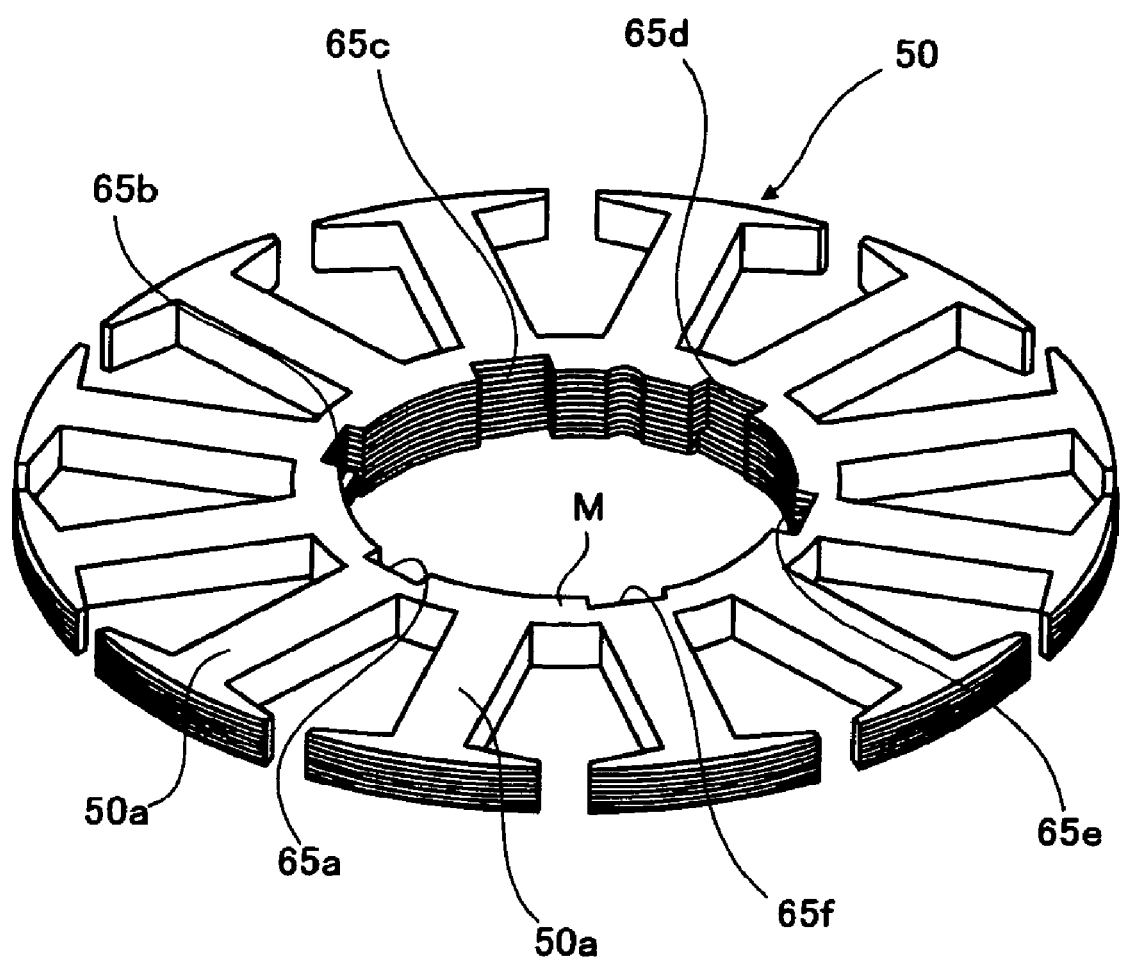
FIG. 4 is a perspective view of a stator core in the same embodiment.
Figure 5C:
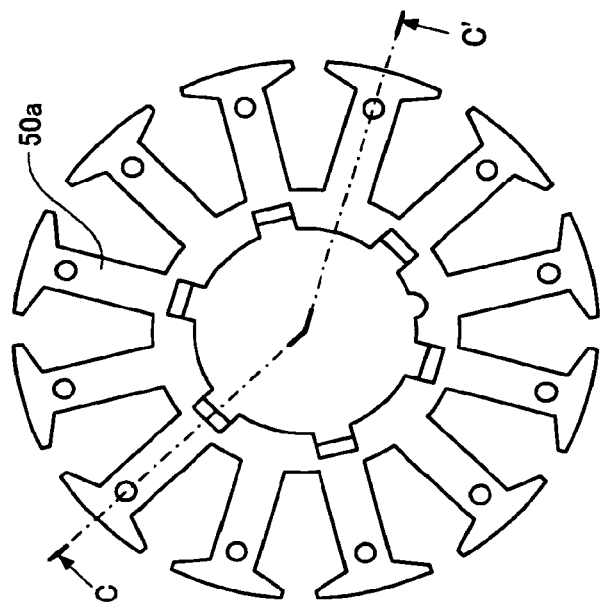
FIG. 5C is a top view of the stator core in the same embodiment.
Figure 5B:
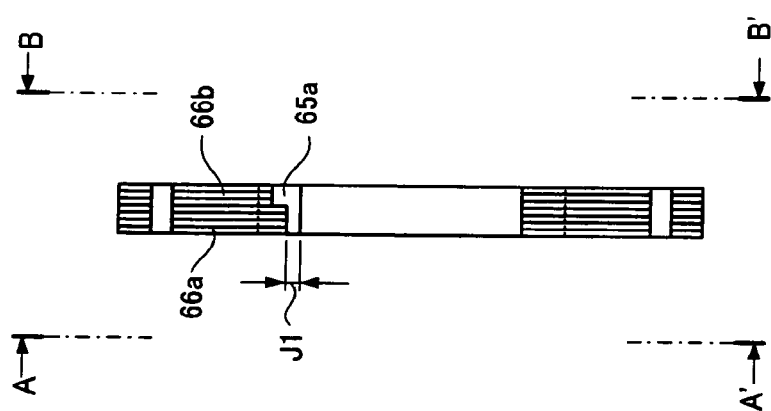
FIG. 5B is a sectional view of the stator core in the same embodiment.
Figure 5A:
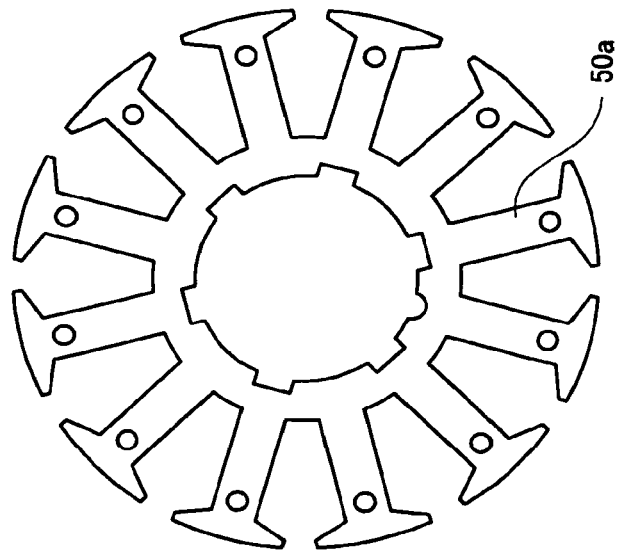
FIG. 5A is a bottom view of a stator core in the same embodiment.

The above described stator core 50 is constructed as shown in FIG. 4 and FIGS. 5A to 5C. FIG. 5A is a view taken along the line A to A' in FIG. 5B, FIG. 5C is a view taken along the line B to B' in FIG. 5B, and FIG. 5B is a section taken along the line C to C' in FIG. 5C.

The stator core 50 which is constructed by laminating magnetic steel sheets has in its center a hole 63 with a diameter which is the same as or a little larger than an inside diameter of the second cylindrical part 56b of the above described housing 56. The outer dimension of the second cylindrical part 56b which houses the bearing 70b in its inner peripheral portion is formed to be larger than the inside diameter dimension of the hole 63 of the stator core 50.

On an inner peripheral surface of the hole 63 of the stator core 50, a plurality of notched parts 65a to 65f are formed at positions corresponding to the second projected parts 62a to 62f of the above described housing 56. The stator core 50 which is constructed by lamination, is constructed by overlaying two kinds of magnetic steel sheets 66a and 66b which differ in notch depth of the above described notched parts 65a to 65f, and several magnetic steel sheets 66a at the A to A' side is smaller in notch depth than the other magnetic steel sheets 66b at the B to B' side. A notch depth J1 of the magnetic steel sheet 66a is formed to be larger than a thickness J2 of the second projected parts 62a to 62f of the above described housing 56.

As for assembly, the annular wall 60 of the housing 56 is inserted into a mounting hole 58a of the plate 58 shown in FIG. 2, and the annular wall 60 is crimped as shown in FIG. 1. Thereby, the first support surface 59a of the housing 56 and the crimped annular wall 60 clamp the plate 58, and the housing 56 is mounted to the plate 58.

Next, the circuit board 57 is placed on the second support surface 59b of the housing 56 so that the hole 57a of the circuit board 57 engages with the outside of the second cylindrical part 56b of the housing 56, and the first projected parts 61, 61 and 61 are crimped as shown in FIG. 1. Thereby, the second support surface 59b of the housing 56 and the crimped first projected parts 61, 61 and 61 clamp the circuit board 57.

Figure 6:
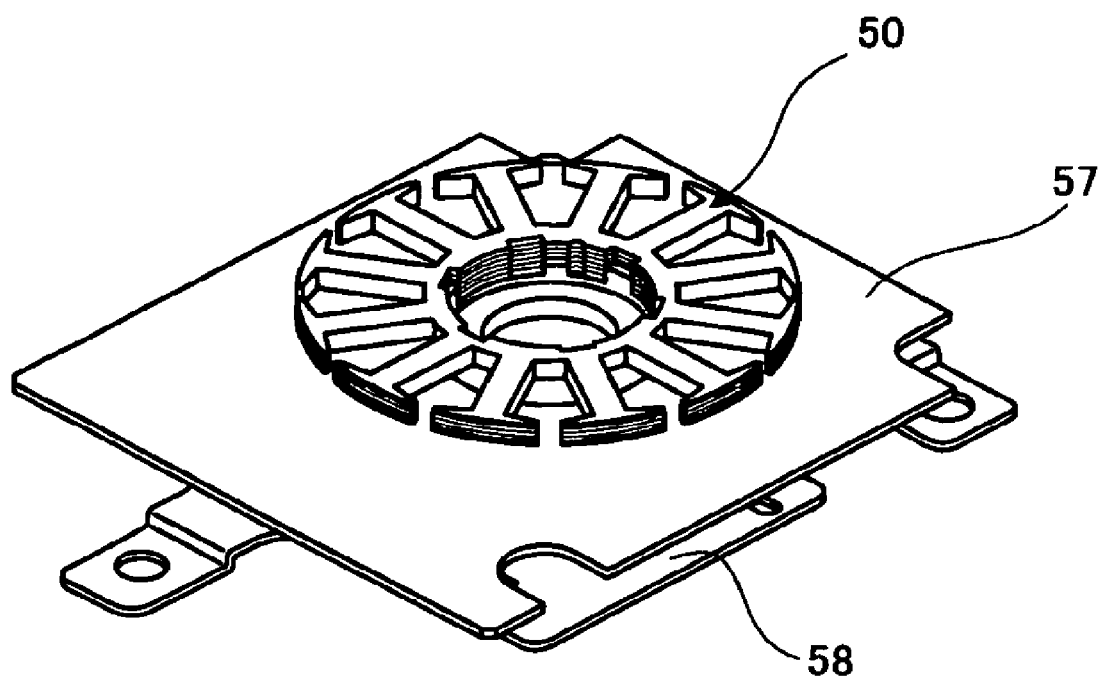
FIG. 6 is a perspective view in the middle of assembly in the same embodiment.

Further, the stator core 50 on which the winding wire 51 is wound is positioned and placed so that the second projected parts 62a to 62f of the housing 56 are housed in the above described notched parts 65a to 65f of the stator core 50. In this case, the stator core 50 is set so that the stator core 50 on the side of the magnetic steel sheet 66a is on the side of the third support surface 59c of the housing 56. FIG. 6 shows the middle of assembly at this time. The winding wire 51 is omitted in the drawing.

Figure 7A:
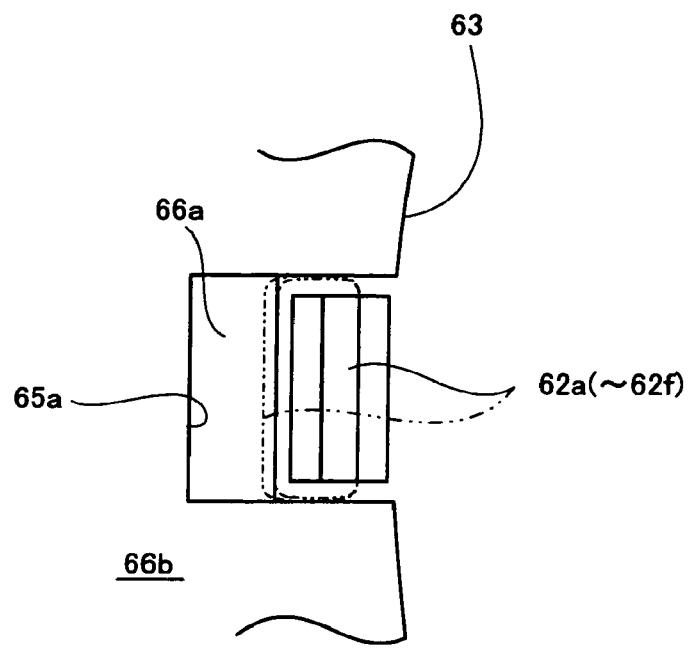
FIG. 7A is an enlarged plane view of a main part in a crimping process step in the same embodiment.
Figure 7B:
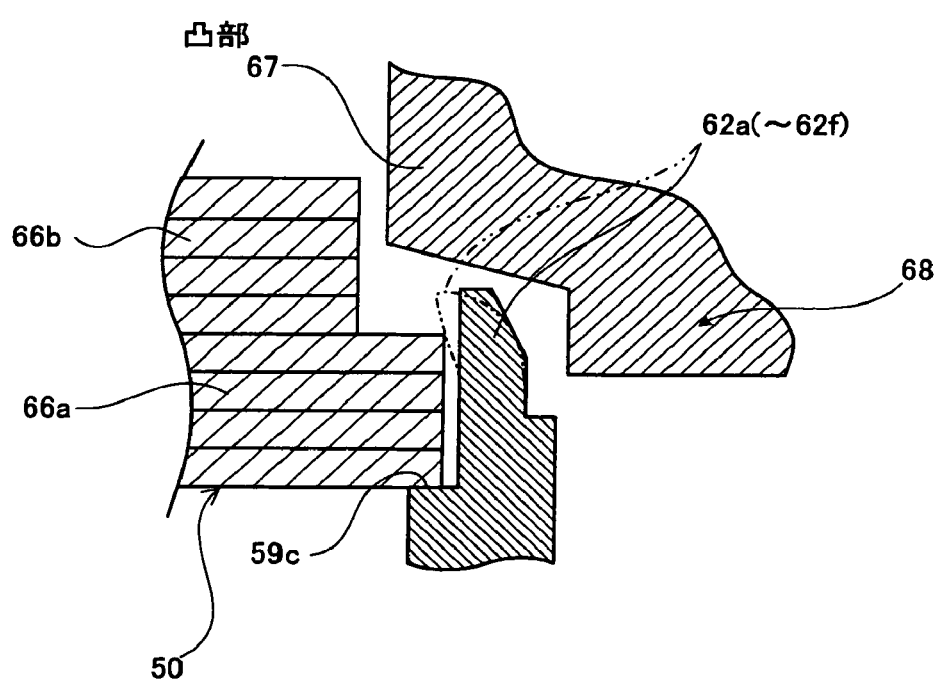
FIG. 7B is an enlarged sectional view of the main part in the crimping process step in the same embodiment.

FIGS. 7A and 7B show an enlarged plane view and a vertical sectional view of the second projected parts 62a to 62f housed in the notched parts 65a to 65f of the stator core 50 at this time.

In the next process step, the second projected parts 62a to 62f are crimped to a phantom line position by using a punch 68 having a projected part 67 with a narrower width than the notched parts 65a to 65f corresponding to the notched parts 65a to 65f of the stator core 50 as shown in FIG. 7B. Thereby, the stator core 50 is held with sufficient strength by the plastically deformed second projected parts 62a to 62f of the housing 56 and the first support surface 59c of the housing 56.

In the final process step, after the bearings 70a and 70b are set at the first and the second cylindrical parts 56a and 56b of the housing 56, the shaft 54 of the rotor 55 is set at the bearings 70a and 70b as shown in FIG. 1, whereby assembly is completed.

Thus, the stator core 50 can be mounted to the housing 56 without using the bolts as in the first prior art example. Further, a part of the outer periphery of the bearing 70b, which is disposed at the position near the stator core 50, of the two bearing 70a and 70b which support the rotor 55 directly abuts the inner periphery of the hole 63 formed in the center of the stator core 50, and therefore, the diameter of the hole 63 formed in the center of the stator core 50 can be made small as compared with the brushless motor in which the housing is interposed between the hole formed in the center of the stator core and the bearing as in the first and the second prior art examples. Thereby, the space for winding the winding wire 51 around the stator core 50 can be secured, and therefore, decrease of output power can be prevented. Thus, the brushless motor, which is suitable for reduction in diameter, space-saving and enhancement in output power, can be provided. Since the housing 56 can be also made small, reduction in material is made possible, and the brushless motor can be provided at low cost.

Further, the positions of the notched parts 65a to 65f in the stator core 50 are suitably set, and therefore, influence in increase of magnetic resistance can be suppressed, and decrease of output power can be prevented. In concrete, the positions of the notched parts 65a to 65f are provided close to the base end portions of the salient poles 50a provided on the outer periphery of the stator core 50 as shown in FIG. 4, and the notched parts 65a to 65f are provided at the positions away from the portion of the magnetic path which connects the adjacent salient poles 50a and on which magnetic flux concentrates. Therefore, influence of increase in the magnetic resistance can be suppressed, and at the same time, it is not necessary to make the slot portions of the stator core shallow to the outside in the radial direction. Therefore, the space for winding the wire on the stator core can be secured, and thus, decrease of output power can be prevented.

The outer periphery of the bearing 70b abuts on the housing 56 only at the positions of the second projected parts 62a to 62f in the range of the thickness of the stator core 50. Therefore, the space at the inner peripheral part of the stator core 50 can be effectively utilized, the space for winding the coil on the stator core can be secured, and decrease of the output power can be prevented.

In the above described embodiment, the stator core 50 is mounted to the housing 56 by plastically deforming the second projected parts 62a to 62f of the housing 56, but the diameter of the hole 63 formed in the center of the stator core 50 can be similarly made small by applying an adhesive between the outer peripheral portions of the second projected parts 62a to 62f of the housing 56 and the inner sides of the notched parts 65a to 65f of the stator core 50 and cured instead of crimping.

Embodiment 2

FIGS. 8 to 10A and 10B show (Embodiment 2) of the present invention.

The above described stator core 50 is constructed as shown in FIG. 8 and FIGS. 9A to 9C.

Figure 9A:
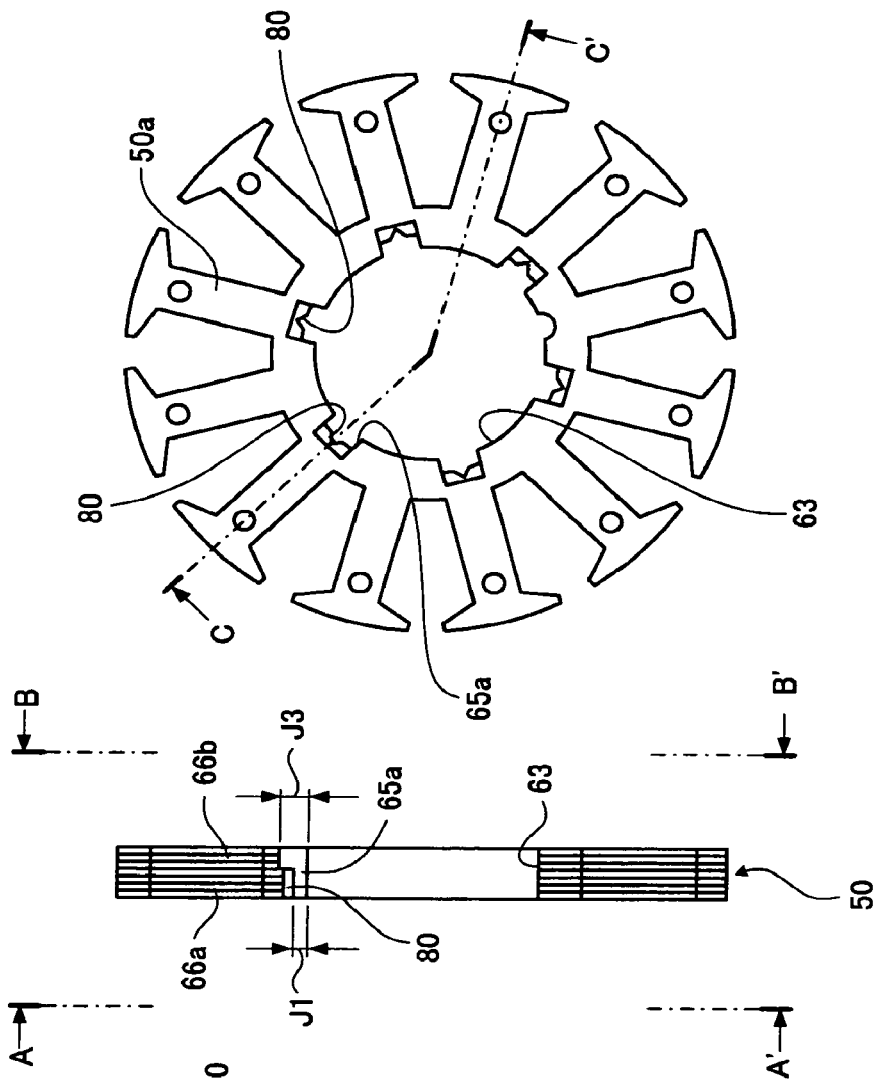
FIG. 9A is a bottom view of the stator core in the same embodiment.
Figure 9B:
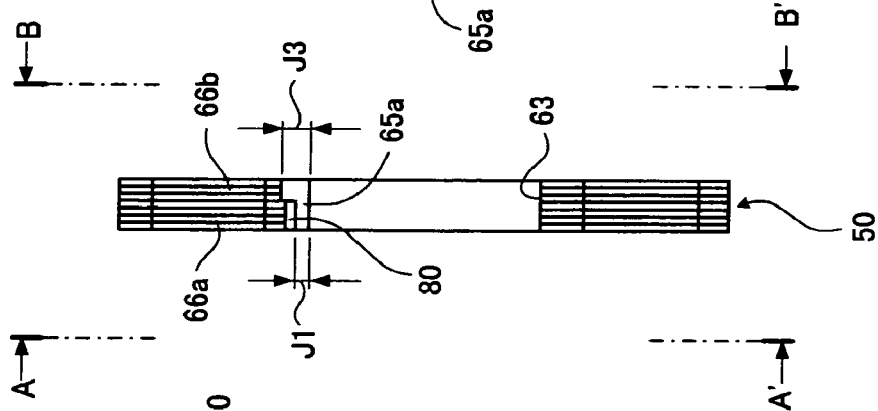
FIG. 9B is a sectional view of the stator core in the same embodiment.
Figure 9C:
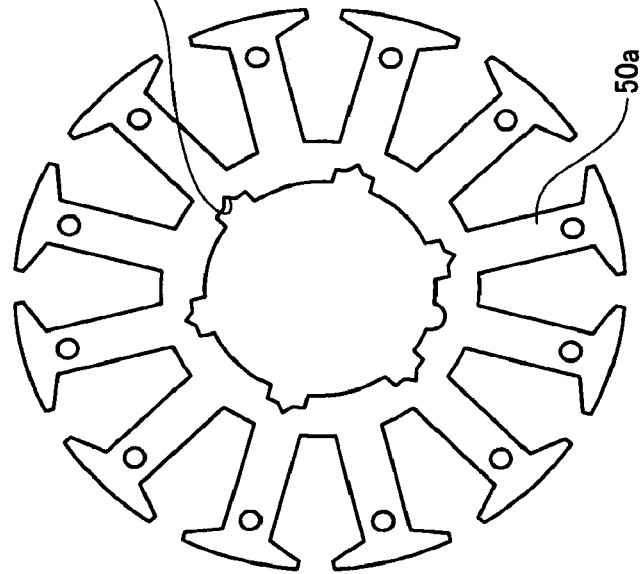
FIG. 9C is a top view of the stator core in the same embodiment.

FIG. 9A is a view taken along the line A to A' in FIG. 9B, FIG. 9C is a view taken along the line B to B' in FIG. 9B, and FIG. 9B is a sectional view taken along the line C to C' in FIG. 9C. The housing 56 is the same as in (Embodiment 1).

The stator core 50 which is constructed by laminating magnetic steel sheets has in its center a hole 63 with a diameter which is the same as or a little larger than an inside diameter of the second cylindrical part 56b of the above described housing 56. The outside dimension of the second cylindrical part 56b which houses the bearing 70b in its inner peripheral portion is formed to be larger than the inside diameter dimension of the hole 63 of the stator core 50.

On an inner peripheral surface of the hole 63 of the stator core 50, a plurality of first notched parts 65a to 65f are formed at positions corresponding to the second projected parts 62a to 62f of the above described housing 56. The stator core 50, which is constructed by lamination, is constructed by overlaying magnetic steel sheets 66a and 66b as the two kinds of cores which differ in notch depth, that is a depth dimension in the radial direction of the above described first notched parts 65a to 65f, and the notch depth J1 of the several magnetic steel sheets 66a at the A to A' side is shallower than a notch depth J3 of the other magnetic steel sheets 66b at the B to B' side in FIG. 9B.

In this embodiment, the thickness J2 of the second projected parts 62a to 62f is as thin as 0.5 mm to 0.7 mm, and the notch depth J1 of the magnetic steel sheet 66a is formed to be the same as or a little larger than the thickness J2 of the second projected parts 62a to 62f of the housing 56.

Further, second notched parts 80 are formed at the magnetic steel sheet 66a. More specifically, the second notched parts 80 extending in the axial direction are respectively formed in the range of the inner side in the radial direction from the outer periphery in the radial direction of the first notched parts 65a to 65f of the magnetic steel sheet 66b.

As for assembly, the annular wall 60 of the housing 56 is inserted into the mounting hole 58a of the plate 58 shown in FIG. 2, and the annular wall 60 is crimped as shown in FIG. 1. Thereby, the plate 58 is clamped by the first support surface 50a of the housing 56 and the crimped annular wall 60, and the housing 56 is mounted to the plate 58.

Next, the circuit board 57 is placed on the second support surface 59b of the housing 56 so that the hole 57a of the circuit board 57 engages with the outside of the second cylindrical part 56b of the housing 56, and the first projected parts 61, 61 and 61 are crimped as shown in FIG. 1. Thereby, the second support surface 59b of the housing 56 and the crimped first projected parts 61, 61 and 61 clamp the circuit board 57.

Further, the stator core 50 on which the winding wire 51 is wound is positioned and placed so that the second projected parts 62a to 62f of the housing 56 are housed in the above described notched parts 65a to 65f of the stator core 50. In this case, the stator core 50 is set so that the stator core 50 on the side of the magnetic steel sheet 66a is on the side of the third support surface 59c of the housing 56.

Figure 10A:
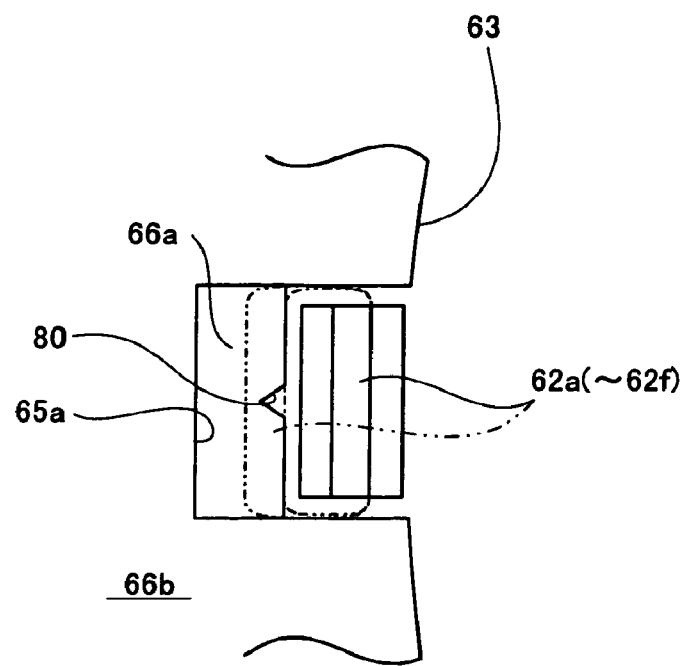
FIG. 10A is an enlarged plane view of a main part in a crimping process step in the same embodiment.
Figure 10B:
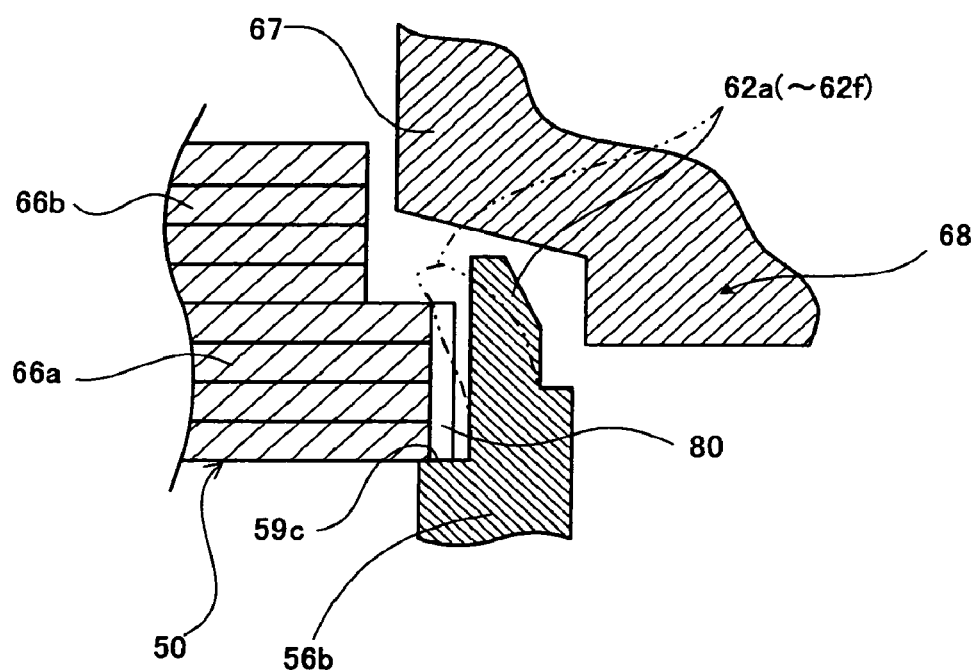
FIG. 10B is an enlarged sectional view of the main part in the crimping process step in the same embodiment.

FIGS. 10A and 10B show an enlarged plane view and a vertical sectional view of the second projected parts 62a to 62f housed in the first notched parts 65a to 65f of the stator core 50 at this time.

In the next process step, the second projected parts 62a to 62f are crimped to a phantom line position by using the punch 68 having the projected part 67 with a narrower width than the first notched parts 65a to 65f corresponding to the first notched parts 65a to 65f of the stator core 50 as shown in FIG. 10B. Thereby, the stator core 50 is held with sufficient strength by the plastically deformed second projected parts 62a to 62f of the housing 56 and the first support surface 59c of the housing 56.

In the final process step, after the bearings 70a and 70b are set at the first and the second cylindrical parts 56a and 56b of the housing 56, the shaft 54 of the rotor 55 is set at the bearings 70a and 70b as shown in FIG. 1, whereby assembly is completed.

Thus, the stator core 50 can be mounted to the housing 56 without using the bolt as in the first prior art example. Further, a part of the outer periphery of the bearing 70b, which is disposed at the position near the stator core 50, of the two bearing 70a and 70b that support the rotor 55 directly abuts on the inner periphery of the hole 63 formed in the center of the stator core 50, and therefore, the diameter of the hole 63 formed in the center of the stator core 50 can be made small as compared with the brushless motor in which the housing is interposed between the hole formed in the center of the stator core and the bearing as in the first and the second prior art examples. Thereby, the space for winding the winding wire 51 around the stator core 50 can be secured, and therefore, decrease of output power can be prevented. Thus, the brushless motor, which is suitable for reduction in diameter, space-saving and enhancement in output power, can be realized. Further, since the housing 56 can be also made small, reduction in material is made possible, and the brushless motor can be provided at low cost.

Figure 8:
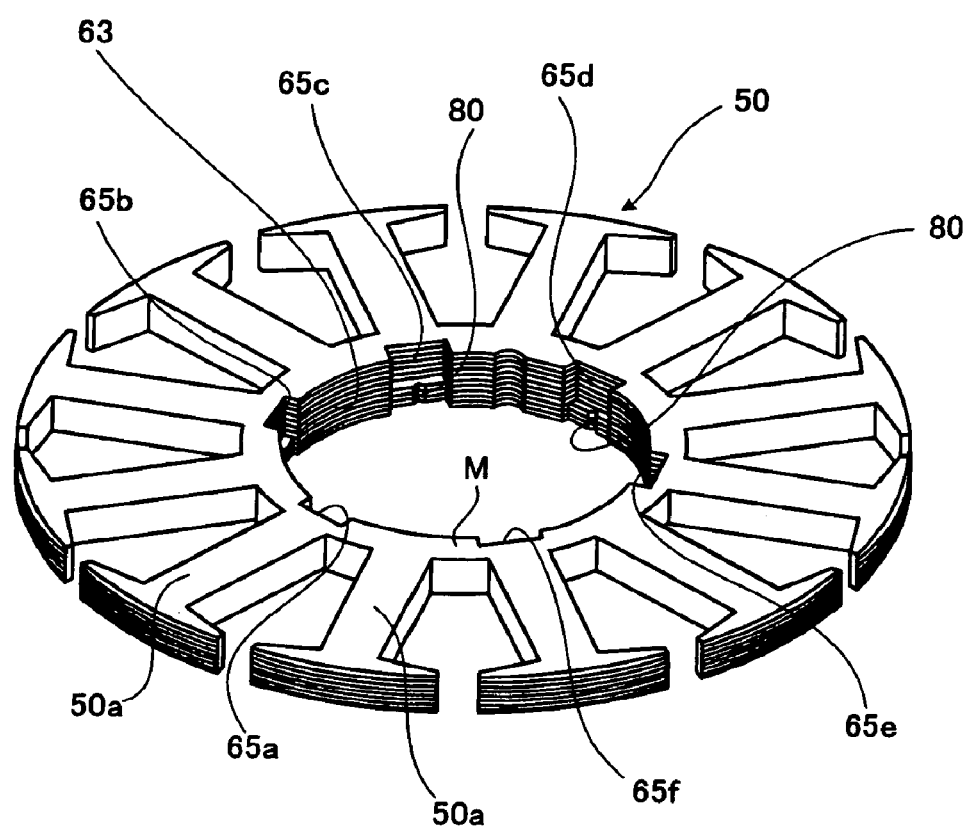
FIG. 8 is a perspective view of a stator core in (Embodiment 2) of the present invention.

Further, the positions of the first notched parts 65a to 65f in the stator core 50 are suitably set, and therefore, influence of an increase in magnetic resistance can be suppressed, and decrease of output power can be prevented. In concrete, the positions of the first notched parts 65a to 65f are provided close to the base end portions of the salient poles 50a provided on the outer periphery of the stator core 50 as shown in FIG. 8, and the first notched parts 65a to 65f are provided at the positions away from the portion of the magnetic path which connects the adjacent salient poles 50a and on which magnetic flux concentrates, of a stator core inner periphery M which is a connecting portion connecting the base end portions of the respective salient poles 50a. 22Therefore, influence of an increase in the magnetic resistance can be suppressed, and at the same time, it is not necessary to make the slot portions of the stator core shallow to the outside in the radial direction. Therefore, the space for winding the wire on the stator core can be secured, and thus, decrease of the output power can be prevented.

The outer periphery of the bearing 70b abuts on the housing 56 only at the positions of the second projected parts 62a to 62f in the range of the thickness of the stator core 50. Therefore, the space at the inner peripheral portion of the stator core 50 can be effectively utilized, the space for winding the coil on the stator core can be secured, and decrease of the output power can be prevented.

When the thickness J2 of the second projected parts 62a to 62f is made as thin as 0.5 mm to 0.7 mm, with a so-called "flat crimping" that folds a projected part tip end, which is conventionally performed in general, the second projected parts 62a to 62f are broken and a necessary holding force for fixing cannot be obtained. With the method for crushing the second projected parts 62a to 62f from above without folding the second projected parts 62a to 62f, a crimping force to the sections of the notched parts of the stator core is insufficient because the thickness of the second projected parts 62a to 62f is thin, and the holding force necessary for fixing cannot be obtained. When excessive pressure is applied from above the second projected parts 62a to 62f, buckling occurs to the receiving portion of the housing 56 at the time of crimping operation. Thus, in this embodiment, the above described second notched parts 80 are provided at the magnetic steel sheet 66a located at the side of the above described third support surface 59c that is the base end portions of the second projected parts 62a to 62f as described above, and therefore, the second projected parts 62a to 62f plastically deformed by crimping are in the state in which they partially dig into the inner sides of the second notched parts 80 as shown by the phantom line in FIG. 10B. The pressure at the time of crimping concentrates on the second notched part 80, and at the same time, the compressed second projected parts 62a to 62f increase the areas crimped to the section in the axial direction of the stator core 50, whereby the holding force necessary for fixing is obtained.

Further, the second notched part 80 is especially effective in the case of the embodiment in which the housing 56 is formed by die-casting. Namely, when the housing 56 is formed by die-casting, the gaps between the second projected parts 62a to 62f and the stator core 50 significantly vary because variations of the shape and dimension accuracy of the second projected parts 62a to 62f are large, and it is difficult to crimp the second projected parts 62a to 62f to the section in the axial direction of the stator core 50 with the pressurizing force in a range which does not apply excessive pressure to the portion receiving the housing 56 at the time of crimping. On the other hand, in this embodiment, the second notched parts 80 are formed, and therefore, the area crimped to the section in the axial direction of the stator core 50 is large. Even if there is a variation in the dimension accuracy of the housing 56, the stator core 50 can be reliably fixed, and there is no need to apply a large pressuring force at the time of crimping. Therefore, a favorable fixing state can be realized without occurrence of buckling to the receiving portion of the housing 56.

Embodiment 3

Figure 11:
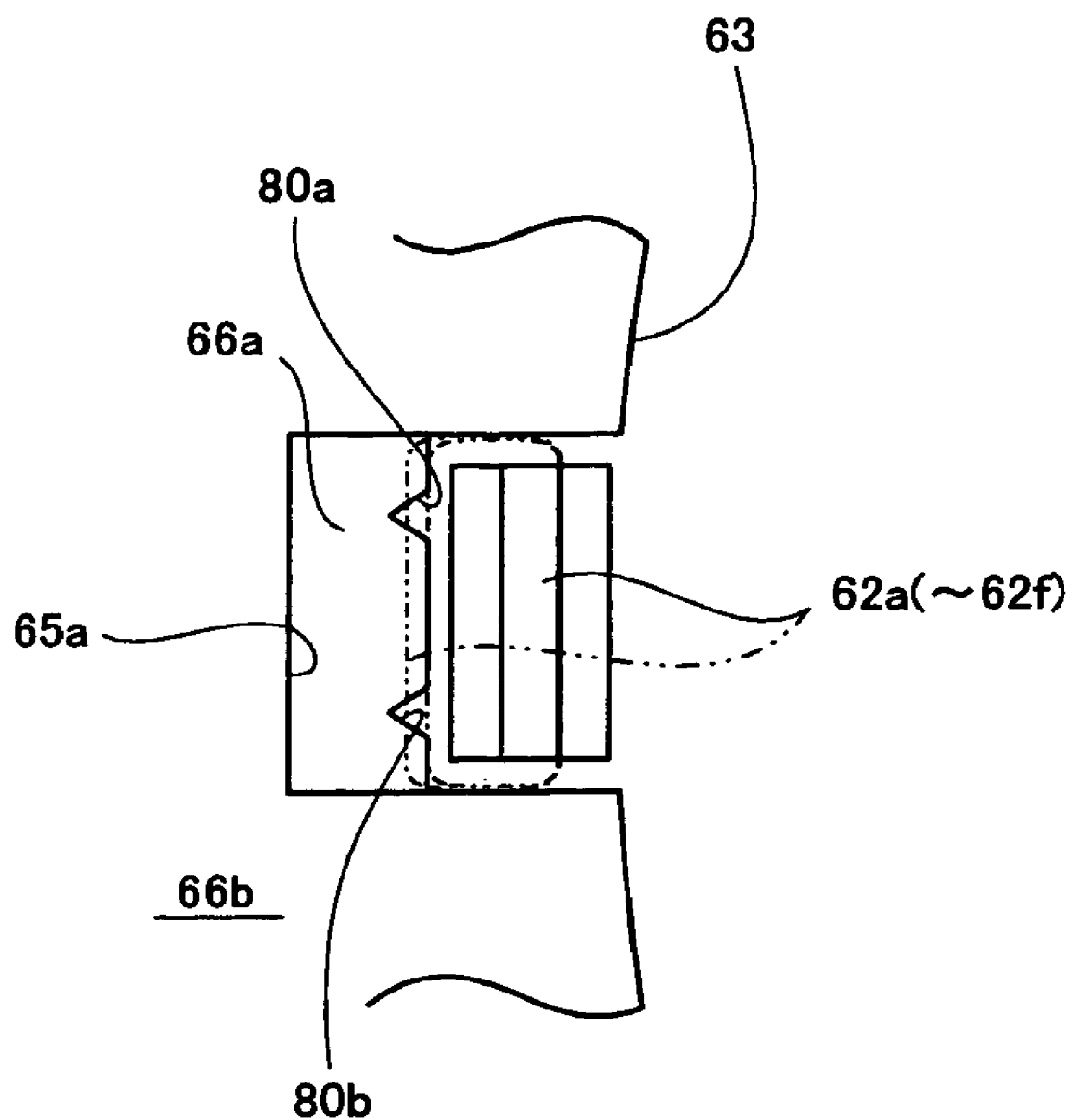
FIG. 11 is an enlarged plane view of a main part of (Embodiment 3) of the present invention.
Figure 14:
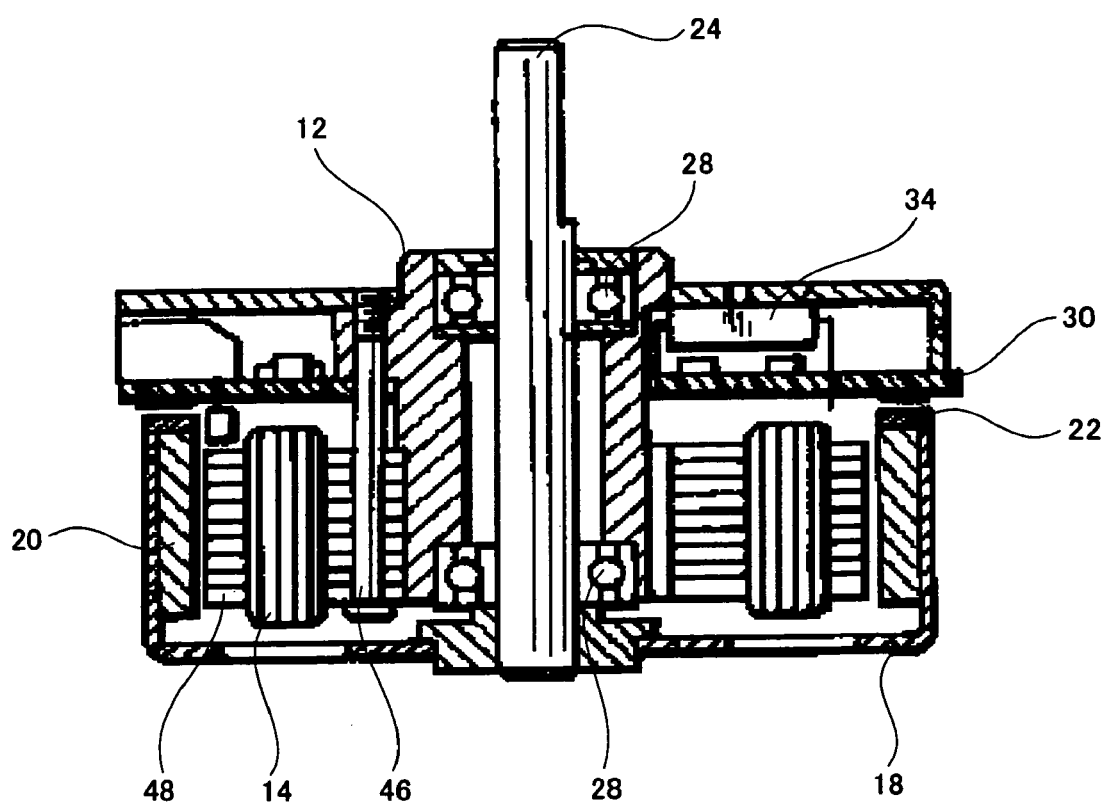
FIG. 14 is a sectional view of a first prior art example.
Figure 15:
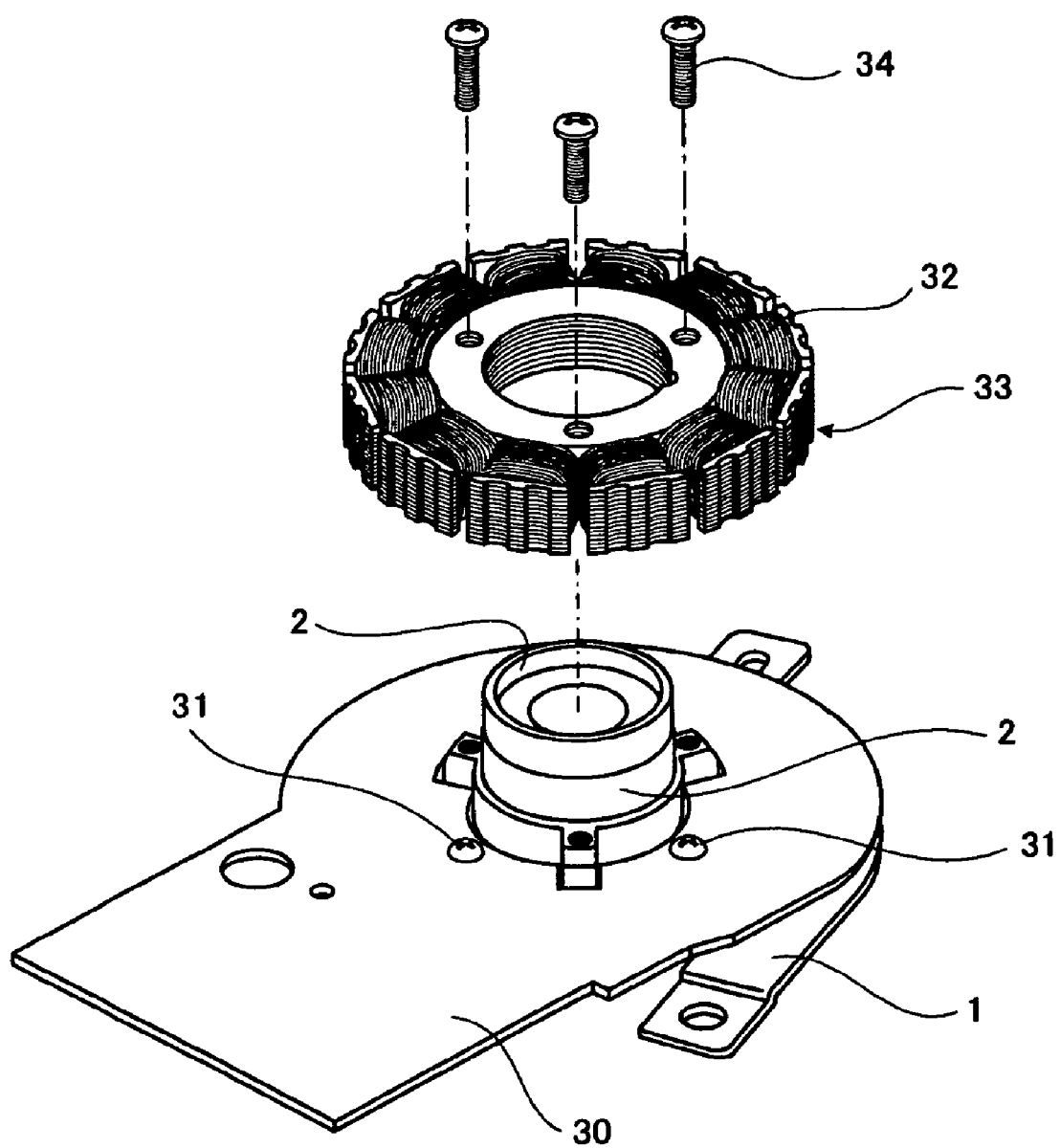
FIG. 15 is an exploded perspective view of another example in which a stator core is fastened to a housing with bolts.
Figure 16:
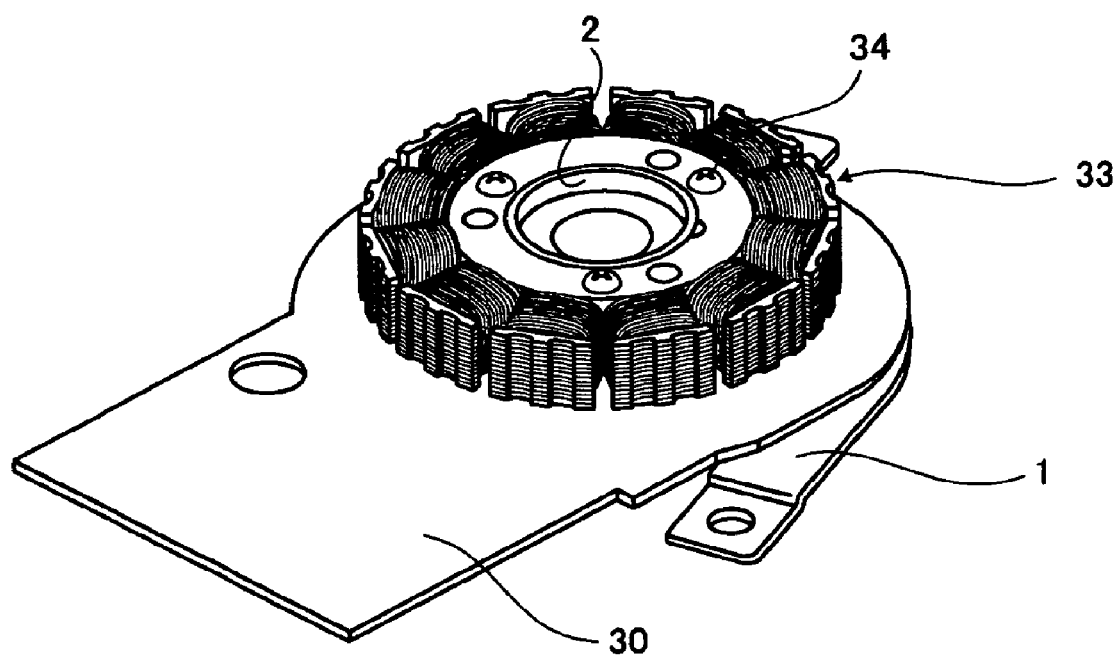
FIG. 16 is a perspective view in the middle of assembly of FIG. 15.
Figure 17:
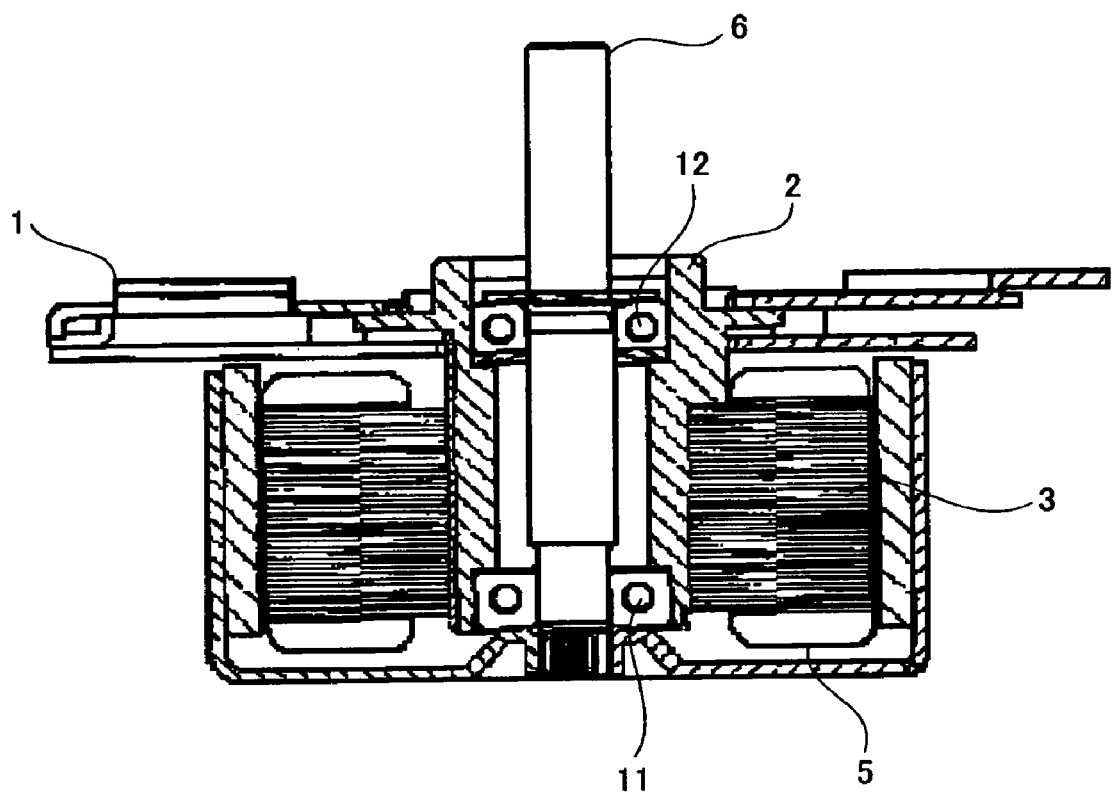
FIG. 17 is a sectional view of a second prior art example.
Figure 18:
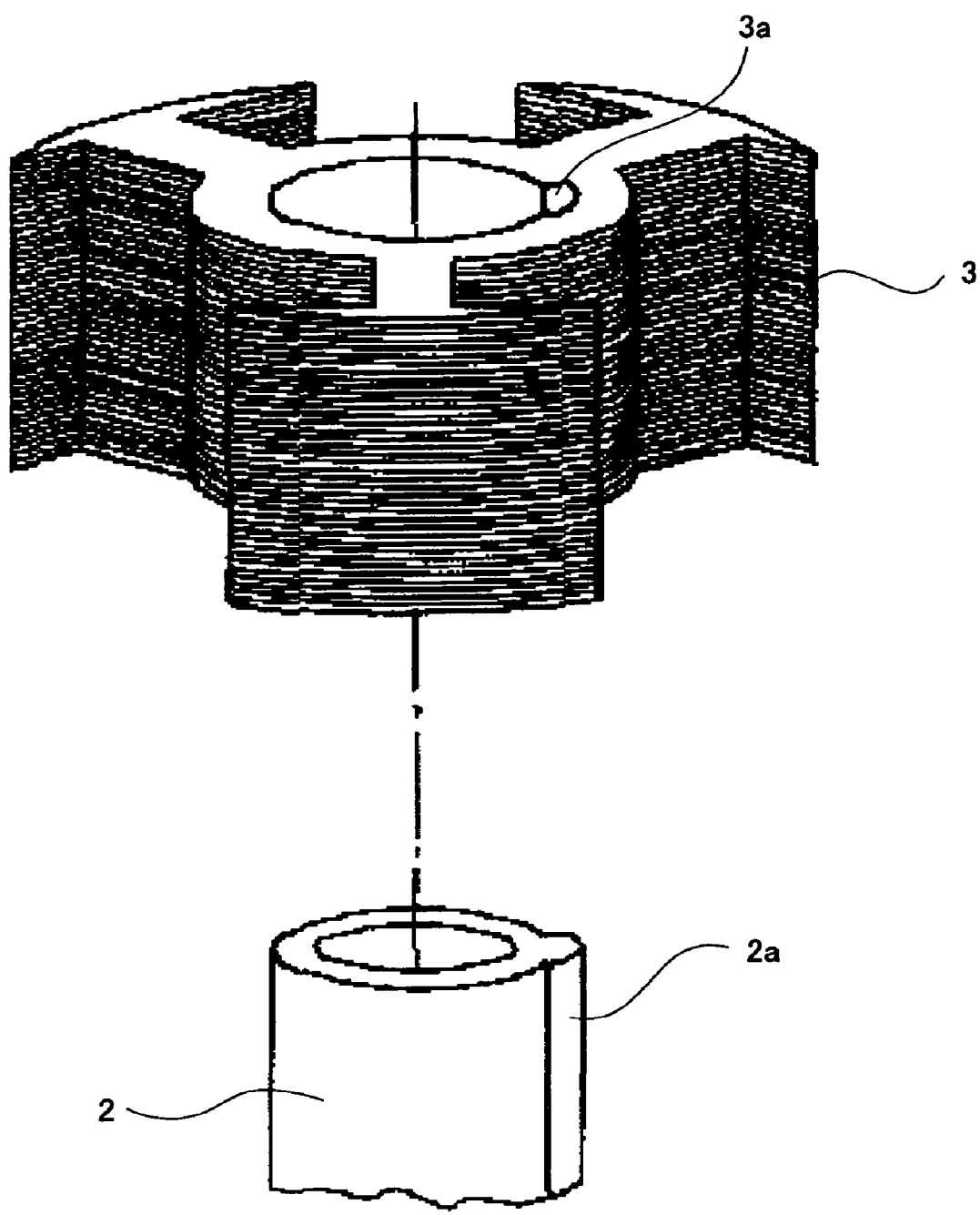
FIG. 18 is an exploded perspective view of a main part of the same prior art example.

In the above described (Embodiment 2), one second notched part 80 is formed for each of the first notched parts 65a to 65f, but a plurality of second notched parts 80a and 80b can be formed at the magnetic steel sheet 66a as shown in FIG. 11.

Embodiment 4

In the above described (Embodiment 2) and (Embodiment 3), the shapes of the second notched parts 80, 80a and 80b are triangles in sectional shapes, but with a notched part 81 rectangular in sectional shape as shown in FIGS. 12A to 12C, the same effect can be expected.

Embodiment 5

In the above described (Embodiment 2) and (Embodiment 3), the shapes of the second notched parts 80, 80a and 80b are triangles in sectional shapes, but with a notched part 82 arcuate in sectional shape as shown in FIGS. 13A to 13C, the same effect can be expected.

The brushless motor of the present invention is useful as a main motor which simultaneously drives various kinds of mechanisms of a copying machine, a laser beam printer and the like.

What is claimed is:

1. A brushless motor, comprising:
a stator core having a plurality of radially-extending poles with a wire wound therearound, a hole in a center thereof, and a plurality of notched parts on an inner circumferential surface adjacent to the hole;
a rotor comprising a rotor frame having at least one magnet attached to an inner periphery of the rotor frame, and a shaft fixed to a center of the rotor frame, the at least one magnet being located opposite the stator core;
two bearings rotatably supporting the shaft, a part of one of two bearing abutting the inner circumferential surface of the stator core; and
a housing holding the bearings and said stator core and having a central cylindrical part that has a larger outside diameter than the hole in the center of the stator core, said housing having a plurality of projected parts located at an outer surface adjacent the stator core at positions corresponding to the notched parts of the stator core;
wherein a part of one of the two bearings not abutting the inner circumferential surface of the stator core is held in the cylindrical part of the housing.

2. The brushless motor according to claim 1, wherein the plurality of notched parts are located at positions corresponding to the salient poles of the stator core.

3. The brushless motor according to claim 1, wherein a part of the outer circumferential surface of the one of said two bearings abuts the housing only at positions where said stator core abuts the housing.

4. The brushless motor according to claim 2, wherein the outer circumferential surface of the one of said two bearings abuts the housing only at positions where said stator core abuts the housing.

5. A brushless motor, comprising:
a stator core having a plurality of radially-extending poles with a wire wound therearound, the stator core having a hole in its center, thereby forming an inner circumferential surface of the stator core;
a rotor comprising a rotor frame having at least one magnet attached to an inner periphery of the rotor frame, and a shaft fixed to a center of the rotor frame, the at least one magnet being located opposite the stator core;
two bearings rotatably supporting the shaft; and
a housing comprising an inner cylindrical part for holding the bearings and an outer part for holding said stator core, said housing having a part of an outer circumferential surface that is adjacent the stator core and a part of the outer circumferential surface that is not adjacent the stator core, said housing comprising a plurality of projected parts on the part of the outer circumferential surface adjacent the stator core, wherein;
a part of an outer circumferential surface of one of said two bearings directly abuts the inner circumferential surface of said stator core, and at least a part of the rest of the outer circumferential surface of said one of the two bearings is held in the cylindrical part of the housing,
said stator core has a plurality of first notched parts for receiving the projected parts, the first notched parts have a first area adjacent the housing and a second area that is substantially not adjacent the housing, the first area adjacent the housing has a more shallow radial depth than the second area substantially not adjacent the housing, and second notched parts are located inside the plurality of first notched parts at positions where the radial depth is shallower, and
the projected parts are elastically deformable in a radial direction for engaging the first and second notched parts.

6. The brushless motor according to claim 5, wherein said stator core comprises laminated cores of different radial depths, corresponding to the radial depths of the first and second areas within the first notched parts.

7. The brushless motor according to claim 6, wherein the second notched parts are more shallow than a difference in depth between the first and second areas of the first notched parts.

8. The brushless motor according to claim 5, wherein the plurality of notched parts are formed along the inner circumference of the stator core at positions corresponding to the salient poles of the stator core.

9. The brushless motor according to claim 6, wherein the plurality of notched parts are formed along the inner circumference of the stator core at positions corresponding to the salient poles of the stator core.

10. The brushless motor according to claim 7, wherein the plurality of notched parts are formed along the inner circumference of the stator core at positions corresponding to the salient poles of the stator core.

11. The brushless motor according to claim 5, wherein the outer circumferential surface of the bearing, abuts the housing only at positions where said stator core abuts the housing.

* * * * *